April 14, 1936.    J. E. A. TRUB    2,037,441
MEASURING DEVICE
Filed Aug. 29, 1933
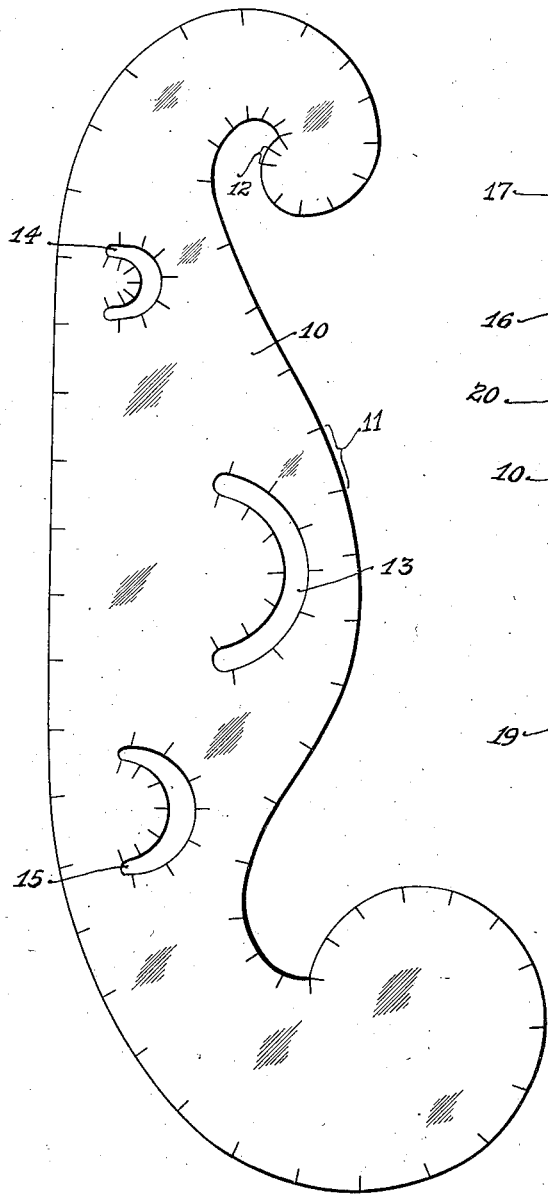
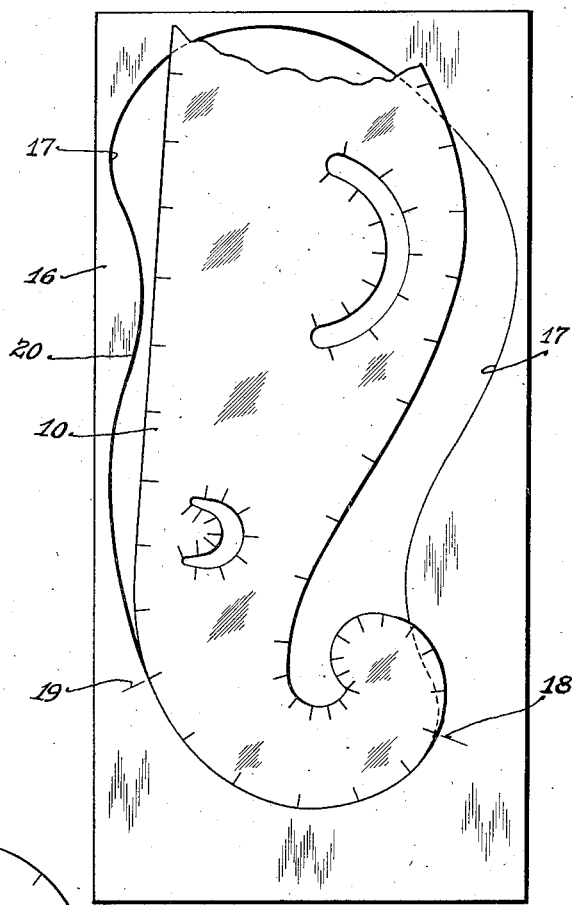
INVENTOR
JOHN E. A. TRUB
BY
ATTORNEY Patented Apr. 14, 1936

2,037,441

UNITED STATES PATENT OFFICE 2,037,441

MEASURING DEVICE

John E. A. Trub, West Orange, N. J.

Application August 29, 1933, Serial No. 687,271

5 Claims. (Cl. 33—1)

This invention relates to improvements in measuring devices, and has for an object the provision of a device for computing the time allowable for cutting, stitching, or otherwise working up materials having complex and curvilinear outlines.

A further object of the invention is the provision of an irregular curve having its outline graduated in divisions corresponding to units of time or of money, or of some standards whereby all portions of the outline of a pattern may be measured by these graduations and the sum of the graduations may be taken as a standard.

Heretofore it has been necessary to make time studies when each new pattern is adopted, particularly in shoe factories and "ready-to-wear" plants. By means of this invention the direct determination of operating time, labor standards, piece rates, and similar measures of performance either by machine or by hand, where these performances or operations vary with the radii of the line along which the operation is to be performed makes it no longer necessary to individually make time studies of each specific job of this character.

The new and improved device consists of an irregular curve of varying radii having curves, portions of which will match up with practically every curve encountered in the patterns used in a particular kind of manufacturing. The form of the device herein shown and described is particularly adapted to the forms of patterns encountered in the uppers of shoes, and the graduations are laid out for determining standards or piece rates for cutting or stitching these uppers. For cutting or stitching patterns for clothing, shirts, dresses, etc., devices are formed having curves suitable for matching the curves used in the patterns in these arts.

Referring to the drawing, Fig. 1 represents an embodiment of the invention suitable for use in the manufacture of shoes.

Fig. 2 is a diagrammatic sketch showing a method of using the device.

The device designated generally by the numeral 10 consists of an irregular curve constructed of celluloid, wood, aluminum, tin, leather, cloth, or any other suitable material. The outline of this curve consists of a straight portion and a curvilinear portion, the latter consisting of concave and convex curves of varying radii. The length of the graduations along the outline represents units of time or of similar standards allowable in the performance of an operation, such as cutting, stitching, etc. In graduating the curve, time studies are carefully made.

It will be noted that along the straight outline of the curve and along the curved portions having long radii, the graduations are comparatively long, and as the radii of the curves decrease the divisions become narrower. For example, the graduations designated by the numeral 11 are substantially wider than those designated by the numeral 12. The reason for this is that the operator has to use more care on the shorter radii, and therefore it takes a longer time to cover a shorter distance.

The device is also provided with cut-out portions 13, 14, and 15, also of curved form, which together with the external outline adapt it for matching all portions of the irregular outlines of shoe uppers.

In describing the use of the device, an illustration will be given of a standard or piece rate for cutting a giving pattern.

Referring to Fig. 2, a pattern 16 having an outline 17 is shown. In order to compute the standard or piece rate for cutting materials to this pattern, the device 10 is utilized. A portion of the curve 10 is matched with a portion of the outline 17 of the pattern. Marks are made on the pattern in line with the two extreme divisions of the matched portion of the curve, for example, at 18 and 19, and the divisions therebetween (between 18 and 19) are counted and recorded. From the drawing it will be seen that six divisions occur between these points. The device 10 is then moved and another portion thereof is matched with the outline 17, beginning at 19 and extending toward 20. The number of divisions therebetween are counted and matched. Then, beginning at 20, more of the outline 17 is matched with the outline of the device and the divisions counted and recorded. This is continued until the starting point 18 is reached, at which time the entire outline 17 has been measured, and the sum of all of the divisions counted in traversing the outline of 17 is the computed standard.

Where varying spacing, varying determination of the location of the line of operation, where different thicknesses of materials and different characters of materials are encountered, and with different types of machines or tools, the divisions on the device would vary, and it has been found preferable to use separate divisions, each of which has been calibrated for the particular operation, material, machine or tool used.

This device has a wide range of uses and may be applied to any task where the operation varies with the radius of the line followed in performing the operation.

Although this invention has been described in connection with one specific embodiment thereof, it must be understood that the details described are not intended to be limitative of the invention insofar as set forth in the following claims.

What is claimed is:

1. A measuring device comprising a member having its edges formed in a series of curves of varying radii, and graduations along said edges spaced apart in accordance with the values of the radius of the curve at the point where a graduation occurs, the spacing apart of said graduations being shorter as the radius of the curve decreases and each graduation representing an equal increment of time required for an operator to traverse said curves or any portion thereof with a tool.

2. A measuring device comprising a member having its edges formed in a series of straight lines and curves of varying radii, and graduations impressed in said member along said edges, the spacing apart of which decreases as the radius of the curve decreases, said graduations each representing an equal increment of time regardless of said spacing.

3. A measuring device comprising a curvilinear member carrying adjacent to its outline divisions calibrated in accordance with units of time required for an operator to traverse said outline with a tool, said divisions being spaced closer together as the curved portions of said member decrease in radius and all representing equal units of time.

4. A device for determining the time required in performing a labor operation, where an irregular line is to be followed in such performance, comprising a member having a series of outlines including both concave and convex curves of varying radii and having calibrations thereon adjacent to said outline representing equal units of time, the spacing of the calibrations on each part of the curve varying in direct proportion to the variations of the radius of curvature of said part of the curve.

5. A transparent irregular curve carrying a series of graduations spaced varying widths apart and representing elapsed time required for a labor operation, for calculating piece work rates, said widths decreasing directly as the radius of the curve decreases.

JOHN E. A. TRUB.